United States Patent
Vortmeyer et al.

(10) Patent No.: US 6,874,792 B2
(45) Date of Patent: Apr. 5, 2005

(54) STABILIZER FOR A MOTOR VEHICLE (75) Inventors: Jens Vortmeyer, Preussisch Oldendorf (DE); Metin Ersoy, Walluf (DE)

(73) Assignee: ZF Lemförder Metallwaren AG, Stemwede-Dielingen (DE)

(*) Notice: Subject to any disclaimer, the term of this patent is extended or adjusted under 35 U.S.C. 154(b) by 195 days.

(21) Appl. No.: 10/333,293

(22) PCT Filed: May 27, 2002

(86) PCT No.: PCT/DE02/01917
§ 371 (c)(1),
(2), (4) Date: Jan. 16, 2003

(87) PCT Pub. No.: WO02/098687
PCT Pub. Date: Dec. 12, 2002

(65) Prior Publication Data
US 2004/0084857 A1 May 6, 2004

(51) Int. Cl.$^7$ ................................................ B60G 17/01
(52) U.S. Cl. ................................ 280/5.511; 280/5.508; 280/124.107; 267/188
(58) Field of Search ...................... 280/5.508, 5.511, 280/124.107; 267/188

(56) References Cited

U.S. PATENT DOCUMENTS

| | | | | |
|---|---|---|---|---|
| 4,648,620 A | * | 3/1987 | Nuss ........................ | 280/5.511 |
| 4,796,911 A | * | 1/1989 | Kuroki et al. ............ | 280/5.511 |
| 5,076,605 A | * | 12/1991 | Umeda .................... | 280/124.107 |
| 5,186,486 A | * | 2/1993 | Hynds et al. ............ | 280/124.107 |
| 5,251,926 A | * | 10/1993 | Aulerich et al. ........ | 280/124.152 |
| 5,257,685 A | | 11/1993 | Tichiaz et al. | |
| 5,527,061 A | * | 6/1996 | Karl ........................ | 280/124.107 |
| 5,573,265 A | * | 11/1996 | Pradel et al. ............ | 280/124.107 |
| 5,575,502 A | * | 11/1996 | Oppitz et al. ............ | 280/124.166 |
| 5,580,079 A | * | 12/1996 | Pradel et al. ............ | 280/124.107 |
| 6,022,030 A | * | 2/2000 | Fehring ................... | 280/5.511 |
| 6,361,033 B1 | * | 3/2002 | Jones et al. ............. | 267/187 |

(Continued)

FOREIGN PATENT DOCUMENTS

| | | | |
|---|---|---|---|
| FR | 2657566 | * | 1/1990 |
| GB | 578199 | | 6/1946 |
| GB | 2154187 | * | 9/1985 |
| GB | 2318771 | * | 5/1998 |
| JP | 60 252015 | | 12/1985 |
| JP | 63 235113 | | 9/1988 |
| JP | 3-61106 | * | 3/1991 |
| JP | 2000-289427 | * | 10/2000 |
| JP | 2000 289427 | | 10/2000 |

OTHER PUBLICATIONS

Derwent Publications Ltd., Lond. GB, Jan. 4, 1995, XP002213832, Database WPI Section PQ, Week 9445.

*Primary Examiner*—Paul N. Dickson
*Assistant Examiner*—George D. Spisich
(74) *Attorney, Agent, or Firm*—McGlew and Tuttle, P.C.

(57) ABSTRACT

A stabilizer for a motor vehicle has a torsion bar divided into two shafts (1 and 2). The two shafts (1 and 2) are connected to one another via a mechanical coupling. The coupling has a locking disk, which is connected to a first of the two shafts (1), rotating with it in unison, and on the circumference of which at least one locking area is formed, and a housing (3), which is connected to the second shaft (2), rotating with it in unison. At least one locking mechanism (10), which is complementary to the locking area and engages the locking area in the coupled state of the coupling, is mounted movably on the housing (3). Furthermore, a spring (11), by which the locking mechanism (10) is pretensioned in the direction of the locking disk, is connected to the housing (3) and to the locking mechanism (10). For switching over between the coupled state and the uncoupled state of the coupling, a release means (6, 15) is provided, which is connected to the housing (3) and by which the locking mechanism (10) can be kept disengaged from the locking area in the uncoupled state against the force applied by the spring (11).

20 Claims, 7 Drawing Sheets

U.S. PATENT DOCUMENTS

| | | | |
|---|---|---|---|
| 6,425,585 B1 * | 7/2002 | Schuelke et al. | 280/5.511 |
| 6,428,019 B1 * | 8/2002 | Kincad et al. | 280/5.511 |
| 6,439,583 B1 * | 8/2002 | Markowetz | 280/5.511 |
| 6,550,788 B2 * | 4/2003 | Schmidt et al. | 280/5.511 |
| 2002/0121748 A1 * | 9/2002 | Ignatius et al. | 280/5.511 |
| 2003/0111805 A1 * | 6/2003 | Carlstedt et al. | 280/5.508 |

* cited by examiner

STABILIZER FOR A MOTOR VEHICLE

FIELD OF THE INVENTION

The present invention pertains to a stabilizer for motor vehicles, especially a stabilizer provided with a torsion bar.

BACKGROUND OF THE INVENTION

It may happen during driving in curves but also in case of unevennesses of the pavement that one wheel of an axle moves farther away from the vehicle body than the other wheel of the same axle. The imaginary connection line (axle line) between the wheel centers is sloped in relation to a plane associated with the vehicle body (chassis plane), whereas the axle line extends in parallel to the chassis plane in the state of rest. The angle formed between the axle line and the chassis plane will hereinafter be associated as a slope angle with this slope.

The difference between the distances between the two wheels, on the one hand, and the motor vehicle body, on the other hand, may lead to an undesired rolling of the motor vehicle body, as a result of which the safety of travel is greatly compromised, especially at high speeds. To reduce this rolling, a stabilizer, which is mounted on the vehicle body and is provided with a torsion bar, is fastened with its ends to the wheel carriers or transversal swinging arms associated with the wheels of the axle. An increasing slope angle will then lead to an increasing torsion of the torsion bar, as a result of which it is achieved that the spring force of the stabilizer will counteract the slope of the chassis plane in relation to the axle line. The risk for an excessive roll is thus reduced.

Stabilizers provided with torsion bars consequently have the task of reducing the tendency of the motor vehicle body to roll during travel in a curve and are known in the state of the art.

Even though the above-described function of the stabilizer is highly desirable in on-road vehicles, a different behavior of a motor vehicle is required in the case of off-road vehicles, because great unevennesses in the terrain leads to the desire to have a great slope angle in order to enable all wheels to have a good road grip. The more slippery the ground, the more important does this become, because a sufficient force can be transmitted to the ground from the wheel only in case of good road grip. An oblique position of the motor vehicle body shall also be kept as small as possible in the case of a great difference between the distances of the two wheels of one axle in order to make it difficult for the vehicle to tip over when the vehicle is being moved at right angles to a slope. Furthermore, the stabilizer may be overloaded and consequently damaged due to the unevennesses or slopes in the terrain, which cause the great slope angle. The effect of a stabilizer is therefore rather undesired in off-road vehicles.

The above-mentioned different requirements on stabilization for road travel, on the one hand, and for off-road travel, on the other hand, do not represent any difficulties for off-road vehicles, which are not used for road travel, and for on-road vehicles, which are not used on terrain, because the motor vehicles can be individually adapted for their respective fields of use.

However, off-road vehicles have become popular for some time and also attractive to many people as on-road vehicles, so that the requirement for a relatively slight stabilization on terrain is contrasted by the requirement for a relatively strong stabilization during road travel.

SUMMARY OF THE INVENTION

The object of the present invention is to provide a stabilizer for a motor vehicle, with which the requirements on stabilization on both the terrain and on the road can be met at a low cost.

The stabilizer according to the present invention for a motor vehicle has a torsion bar divided into two shafts, wherein the two shafts are connected to one another via a mechanical coupling. The coupling has a locking disk, which is connected to the first of the two shafts, rotating with it in unison, and which has at least one locking area on its circumference, and a housing connected to the second shaft, rotating with it in unison. At least one locking means, which is complementary to the locking area and engages the locking area in the coupled state of the coupling, is mounted movably on the housing. Furthermore, a spring, by which the locking means is pretensioned in the direction of the locking disk, is connected to the housing and to the locking means. This means that the spring applies a force on the locking means in the direction of the locking disk. A release means, which is connected to the housing and by which the locking means can be kept disengaged from the locking area against the force applied by the spring in the uncoupled state, is provided for switching over between the coupled and uncoupled states of the coupling. In particular, the locking area and the locking means are provided and arranged in the radial direction in relation to the locking disk, "radial" being defined here as a direction at right angles to the axis of rotation of the locking disk.

The state in which the first shaft and the second shaft are connected to one another such as to rotate in unison is called the coupled state of the stabilizer according to the present invention. This state is achieved by the locking means arranged on the housing engaging the locking area provided on the locking disk, as a result of which the connection between the first shaft and the second shaft, which connection rotates in unison, is formed. The first shaft and the second shaft thus form a torsion bar in the coupled state.

The state in which the first shaft and the second shaft are connected to one another in such a way that they rotate in unison is called the uncoupled state of the stabilizer according to the present invention. This state is achieved by the locking means being brought out of engagement with the locking area and being kept disengaged by the release means against the force applied by the spring. Consequently, the locking means is located at a spaced location from the locking disk, so that the connection between the first shaft and the second shaft, which connection rotates in unison, is abolished or released.

However, the stabilizer according to the present invention can also be changed over by means of the release means from the uncoupled state into the coupled state by the release means ceasing to apply an opposing force any longer against the force applied by the spring on the locking means. In this case, the locking means is no longer held by the release means at a spaced location from the locking disk, so that the locking means comes into contact with the periphery of the locking disk because of the force of the spring. Depending on the current position of the locking disk, the locking means and the locking area now either engage one another directly, as a result of which the coupled state is established, or the locking means is located at a spaced location from the locking area on the periphery of the locking disk without being engaged with the locking area, as a result of which a state is reached that will hereinafter be called a precoupled state.

The precoupled state can occur only when the two wheels of one axle, on which the stabilizer is arranged, do not have exactly the same distance from the vehicle body. Since this can be frequently expected to happen, e.g., because of unevennesses of the pavement, the problem of how the stabilizer according to the present invention can be changed over from the uncoupled state into the coupled state will consequently arise.

If the motor vehicle is being moved on the road or off the road, rolling movements of the motor vehicle, which are transmitted via the first and second shafts to the locking disk and to the housing, will inevitably occur because of the unevennesses of the pavement or the terrain, so that the locking disk and the housing perform rotary movements in relation to one another. During these rotations of the locking disk in relation to the housing, the locking disk will also assume a position after a short time under the usual road conditions in which the locking means comes to overlap the locking area. The locking means and the locking area will then engage each other in this case in order to form the coupled state.

Since the stabilizer according to the present invention is a switchable stabilizer, which can be switched over between the coupled state and the uncoupled state, the stabilizer according to the present invention makes it possible to meet both the requirements imposed off the road and those imposed on it on the road. Moreover, the mechanical coupling of the stabilizer according to the present invention has, in particular, a simple design and can be manufactured at low cost. Because of this simple design, the stabilizer according to the present invention is, furthermore, especially not prone to troubles and has a long service fife.

The locking area may be designed as a bulge on the locking disk, which engages a recess provided in the locking means. However, the locking area is preferably designed as a recess in the locking disk, in which case the locking means has such a design that it engages the recess in the coupled form to establish a connection between the housing and the locking disk, which connection rotates in unison.

The locking means may be designed as a linearly moved piston, which can be moved in the radial direction toward the locking disk or away from same in relation to the symmetry axis of the locking disk. However, the locking means is preferably designed as a lever arm mounted pivotably with one of its ends on the housing, whose other end engages, e.g., the recess, e.g., with a bolt in the coupled state.

The release means may have a piston or a pivotably mounted lever for moving the locking means. However, the release means preferably has a cam plate (cam disk), which is arranged concentrically to the locking disk and is mounted on the housing rotatably in relation thereto. By a rotary movement of the cam plate, a cam of the cam plate can be pressed against the locking means to form the uncoupled state such that the locking means can be disengaged from the locking area and brought into a spaced location from the locking disk against the force applied by the spring. The cam has such a shape for this purpose that by rotating the cam plate in a direction of rotation defined as a positive direction, the locking means can slide along the surface of the cam and continuously increase its distance from the locking disk in the process until the locking means has reached its position associated with the uncoupled state.

To assume the coupled state or the precoupled state, the cam plate can be rotated back in the negative direction of rotation, whereupon the locking means will again reduce its distance from the locking disk because of the force applied by the spring, following the surface of the cam. However, the cam plate may also be rotated farther in the positive direction of rotation. When the locking means now passes beyond the point on the cam surface that has the greatest distance from the axis of rotation of the cam plate (vertex), the locking means will again move in the direction of the locking disk.

The cam may be provided, similarly to a sawtooth, with a flatly rising curve and a steeply dropping flank. In this case, the locking means changes abruptly over into the coupled or precoupled state as soon as the vertex of the cam has been passed. Thus, the coupled state or the precoupled state can be reached considerably more rapidly than by rotating the cam plate back.

The release means may have a hydraulic, pneumatic or mechanical actuating means, with which the mechanical coupling can be actuated for switching over between the coupled state and the uncoupled state. However, the release means preferably has an electric motor, which is arranged stationarily on the housing and which can actuate the mechanical coupling via a gear mechanism. If the release means has a cam plate, the electric motor is preferably connected to the cam plate via the gear mechanism, so that the cam plate can be rotated by the electric motor.

Since the electric motor must work essentially only against the spring if the friction losses are ignored, a relatively low-power and consequently also small electric motor can be used for the stabilizer according to the present invention. However, considerable costs can be saved as a result compared with a hydraulic or pneumatic solution. The space requirement is markedly reduced as well.

A sensor for detecting the coupled or uncoupled state may be provided at the stabilizer according to the present invention, the sensor sending an electric signal characterizing the coupled or uncoupled state to an evaluating unit. This sensor may be formed, e.g., by a simple mechanical switch. However, the sensor is preferably formed by a Hall element, which is arranged stationarily in relation to the housing and cooperates with a permanent magnet fastened to the locking means.

If the release means has a cam plate, the locking means can be permanently held by the cam plate at a spaced location from the locking area in the uncoupled state. In case of a power failure in the motor vehicle, the stabilizer will, however, be very likely now to remain in the uncoupled state, which may be undesired for safety reasons.

To solve this problem, the locking means may be designed according to a first variant as a locking means that can be magnetized at least in some areas and it can be held by an electromagnet at a spaced location from the locking area in the uncoupled state after the cam plate has brought the locking means over into its position associated with the uncoupled state. The cam plate is then again rotated into a position associated with the coupled state, so that the locking means released by the electromagnet is changed over into the coupled state or into the precoupled state in case of a power failure in the motor vehicle because of the force applied by the spring. The permanent magnet acts permanently against the force of the spring while the uncoupled state is maintained.

According to a second variant, the release means has an electromagnet arranged stationarily in relation to the housing and an at least partially magnetizable blocking element, which is mounted movably in relation thereto and which is brought by the magnetized electromagnet in the uncoupled state against the force applied by a resetting spring into a blocked position, in which the locking means is kept mechanically disengaged from the locking area by the blocking element.

According to this embodiment, the blocking element can be moved to and fro between an inoperative position with the electromagnet switched off and a blocked position with the electromagnet switched on, the resetting spring resetting the blocking element into the inoperative position when the electromagnet is switched off. The blocking element is arranged outside the range of action of the locking means in the inoperative position, so that the blocking element does not block the engagement of the locking means with the locking area. However, the blocking element mechanically prevents the engagement of the locking means with the locking area in the blocked position, and the blocking element is supported on the locking means, on the one hand, and on the housing, on the other hand. The blocking element may also be supported on the housing indirectly, e.g., via the first shaft.

To assume the uncoupled state, the locking means is transferred into the uncoupled position by means of the cam plate, as in the first variant. If this position has been reached, the blocking element is brought by the electromagnet into the blocked position, and the cam plate is subsequently rotated further or back into a position associated with the coupled state.

If a power failure occurs in the uncoupled state, the blocking element is reset by the resetting spring into the inoperative position. However, the mechanical blocking for the locking means is also abolished hereby at the same time, so that the locking means is transferred into the coupled state or into the precoupled state because of the force applied by the spring.

Since the locking means is mechanically kept disengaged from the locking area in the uncoupled state according to the second variant and the resetting spring only needs to move the blocking element, the latter may be designed as a weaker blocking element compared with the spring for the locking means, so that a smaller electromagnet can be used than in the first variant and installation space can thus be saved.

Furthermore, a slope angle detection device for determining the angle by which the first shaft is rotated in relation to the second shaft may be provided at the stabilizer according to the present invention, the said slope angle detection device sending an electric signal characteristic of the angle determined to the evaluation device. Since the electric signal sent by the slope detection device characterizes the twisting angle between the first and second shafts and this twisting angle describes the path difference between the particular distances between the two wheels of the axle and the vehicle body, the electric signal sent by the slope angle detection device is an indicator of the current slope angle of the motor vehicle.

In addition, a level detection device for detecting the angle by which one of the two shafts is twisted in relation to the motor vehicle body may be provided at the stabilizer according to the present invention, the said level detection device sending an electric signal characterizing the angle detected to the evaluating device. This electric signal describes the distance between the wheel associated with the shaft in question and the motor vehicle body at least in the uncoupled state.

Based on the precoupled state, the coupled state is assumed by the locking means becoming overlapped with the locking area due to rolling movements of the motor vehicle. However, a level regulating means, which can be controlled by the evaluating unit, especially taking into account the slope angle for bringing about the coupled state, is preferably provided in the motor vehicle. This can be achieved by the level regulating means changing the distance between one of the two wheels and the motor vehicle body until the locking means and the locking area engage one another.

The stabilizer according to the present invention may have a plurality of locking areas and a plurality of locking means. For example, an additional locking area may be provided on the locking disk, in which case the two locking areas are arranged diametrically opposite each other. Furthermore, an additional locking means, which is associated with the additional locking area, and a locking means having a design complementary thereto may be provided, and the two locking means are also arranged opposite each other. It is possible, e.g., with this arrangement to tension a spring between the two locking means, so that only a single spring is necessary to pretension the two locking means in relation to the locking disk.

However, two additional locking areas are formed on the circumference of the locking disk, and two additional locking means, which are associated with the said locking areas and have a design complementary thereto, are movably mounted on the housing, an angle of 120° each being formed between the locking areas. A spring connected to the locking means and to the housing is also associated with each of the locking means. Consequently, a total of three locking areas and three locking means are provided, so that high torques can be transmitted via the mechanical coupling.

If the release means has a single cam plate for a plurality of locking means, the number of cams formed on the cam plate is equal to the number of locking means, and the cams form the same angle with one another as do the locking means with one another.

The symmetry axes of the two shafts may be located on a common straight line over the entire torsion bar area of the stabilizer. However, the two shafts are introduced into the housing offset in relation to one another, as a result of which space needed for installation can be saved in the housing in the longitudinal direction of the stabilizer.

The present invention will be described below on the basis of a preferred embodiment with reference to the drawings.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
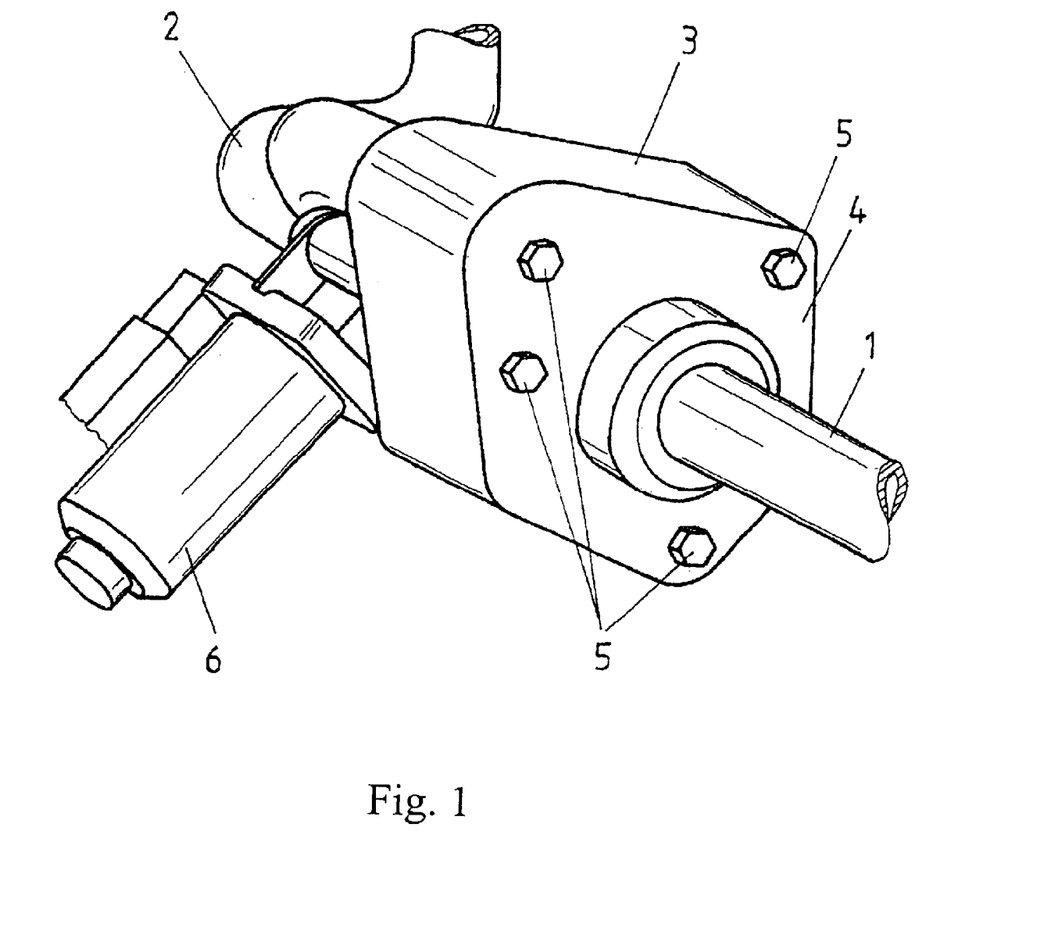
FIG. 1 is a perspective view of the embodiment of the stabilizer according to the present invention in the assembled state.

Referring to the drawings in particular, FIG. 1 shows a perspective view of an embodiment of the stabilizer according to the present invention in the assembled state. The stabilizer has a torsion bar, which is divided into a first shaft 1 and a second shaft 2. The two shafts 1 and 2 are introduced into a housing 3, the second shaft 2 being connected to the housing 3, rotating with it in unison. The housing 3 is closed with a housing cover 4 by means of screws 5, and the first shaft 1 is mounted rotatably in the housing cover 4. A mechanical coupling, by means of which the first shaft 1 and the second shaft 2 can be coupled with one another rotating in unison, is provided in the housing 3. The coupling between the first shaft 1 and the second shaft 2, which coupling rotates in unison, will hereinafter be called the coupled state. However, the first shaft 1 and the second shaft 2 can also be again uncoupled from one another by means of the mechanical coupling, so that the first shaft 1 is rotatable in relation to the second shaft 2. This state will hereinafter be called the uncoupled state. An electric motor 6 is fastened to the housing 3 for actuating the mechanical coupling.

Figure 2:
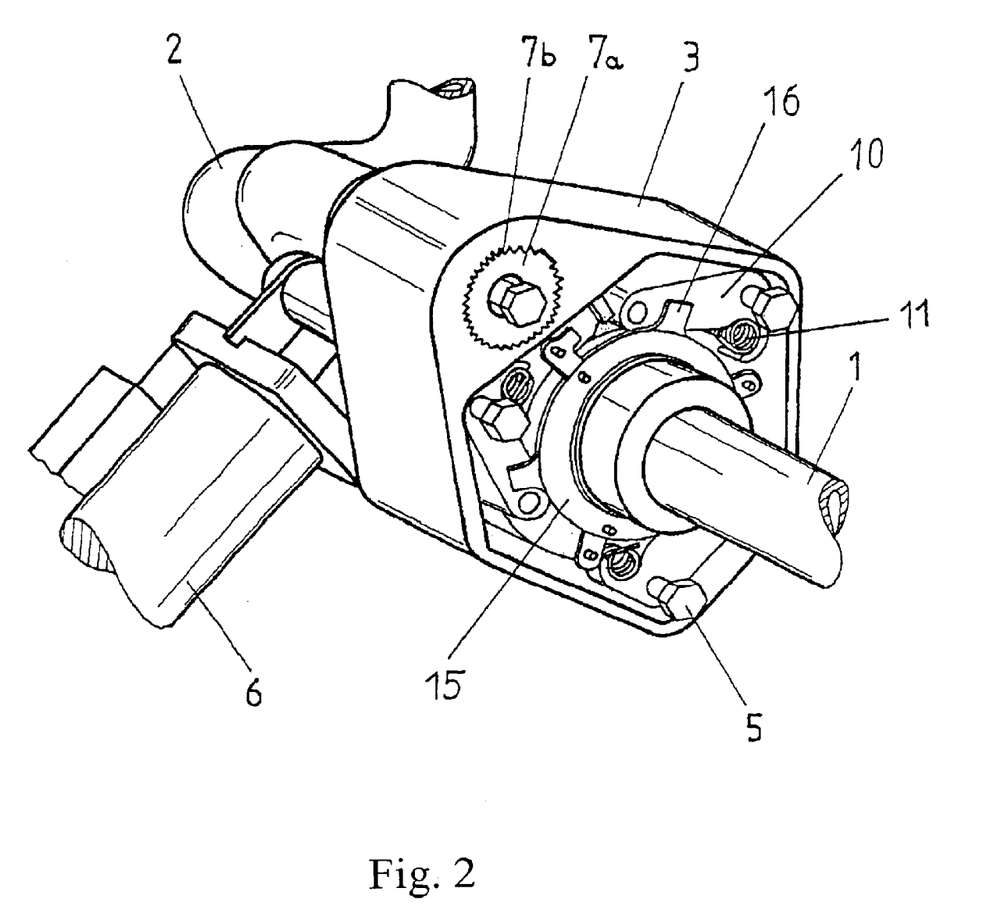
FIG. 2 is a perspective view of the embodiment according to FIG. 1 in a partially assembled state.

FIG. 2 shows the embodiment according to FIG. 1 in the coupled state with the housing cover 4 removed. The second shaft 2 is inserted with its end facing the first shaft 1 and having an outer toothed ring 7a into a housing hole, which has an inner toothed ring 7b and engages the outer toothed ring 7a, as a result of which the connection rotating in unison between the housing 3 and the second shaft 2 is formed. To reduce the space needed for the stabilizer according to the present invention, the first shaft 1 and the second shaft 2 are arranged eccentrically in the housing 3 according to this embodiment, the second shaft 2 being bent twice at a short distance from the housing 3 such that it extends, when viewed from the housing, behind the second bend along a straight extension of the first shaft 1. An additional bend is provided at the end of the second shaft 2 facing away from the housing to form a lever for actuating the stabilizer.

Figure 3:
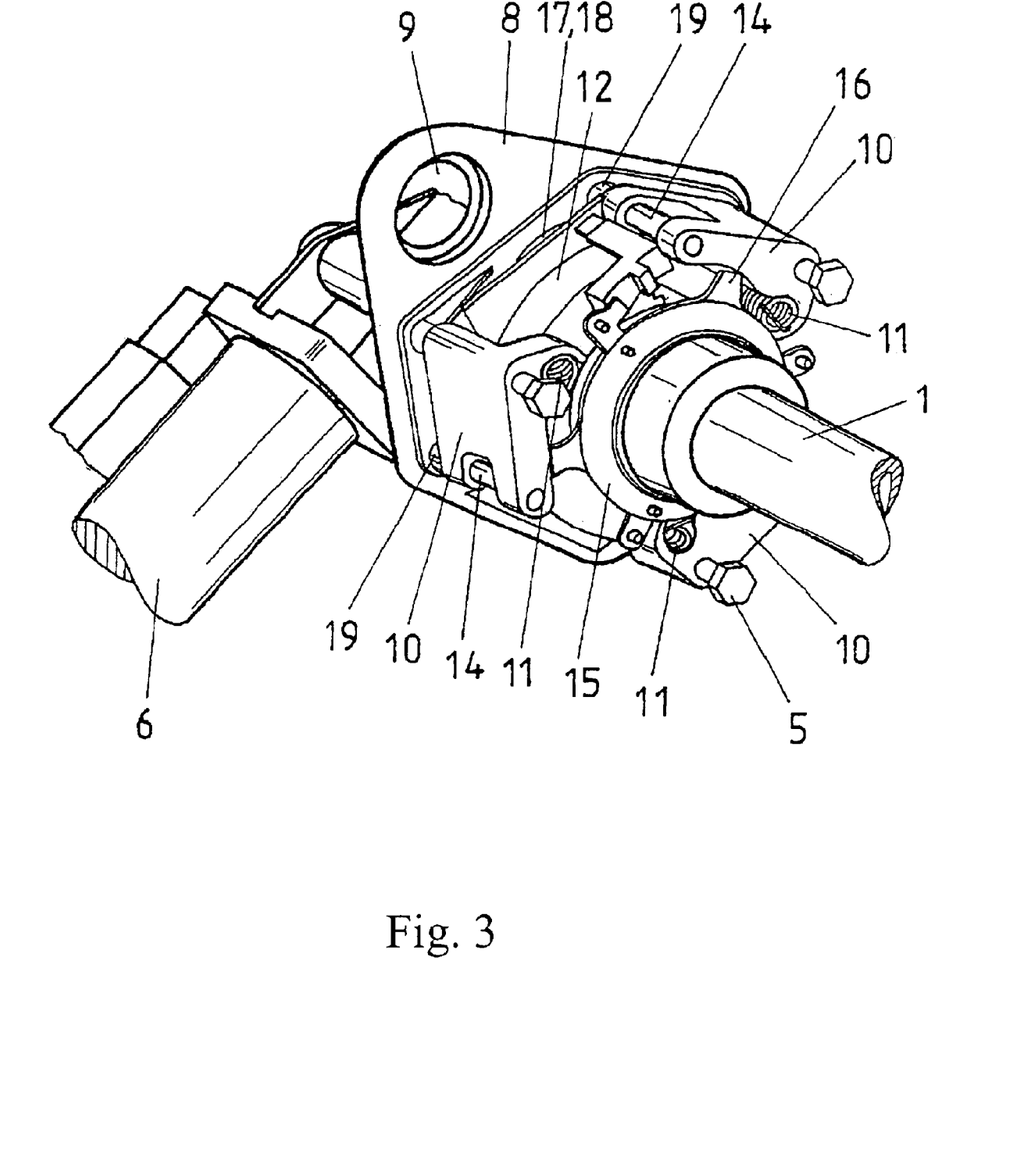
FIG. 3 is a perspective view of the embodiment according to FIG. 1 in another partially assembled state.

FIG. 3 shows an embodiment according to FIG. 2 in the uncoupled state without the second shaft 2 and without the jacket surface of the housing 3. Three lever arms 10 are mounted pivotably around the screws 5 at the rear wall 8 of the housing 3, which said rear wall is provided with a hole 9 for passing through the second shaft 2, and a leg spring 11 each is arranged at each of the lever arms 10, and the said leg spring 11 is supported in relation to the housing 3, on the one hand, and in relation to the respective lever arm 10, on the other hand, such that the said lever arm is pushed into the interior of the housing in the direction of the first shaft 1 with its end facing away from the pivoted mount. At the end of the first shaft 1 facing the second shaft 2, the first shaft 1 is connected to a cylindrical locking disk 12 rotating in unison with it, in the jacket surface of which three recesses 13 (see FIG. 4) are formed. An angle of 120° each is formed between the recesses 13, and the lever arms 10 have at their ends facing away from the pivoted mount a locking bolt 14 each, with which they can engage the recesses 13. The lever arms 10 with the locking bolts 14 are pressed by the springs 11 against the locking disk 12, so that the locking bolts 14 are either in contact with the surface of the locking disk 12 or they engage the recesses 13 when the lever arms 10 are not being held at a spaced location from the locking disk 12 by an opposing force.

This opposing force is generated in the uncoupled state by a ring-shaped blocking element 15, which is arranged in the housing 3 concentrically to the first shaft 1 and rotating in unison therewith. The blocking element 15 is displaceable in the longitudinal direction of the first shaft 1, which is rotatable in same and is provided with three radially outwardly projecting blocking cams. 16 around its circumference. The blocking cams 16 prevent the movement of the lever arms 10 in the direction of the locking disk 12 in the uncoupled state, and an angle of 120° each is formed between two adjacent blocking cams 16. According to FIG. 3, the blocking disk 15 is arranged between the lever arms 10 and the first shaft 1 in a blocked position, in which the coupled state is mechanically prevented from being assumed. Contrary to this, the blocking element 15 is displaced along the first shaft 1 in the direction away from the housing rear wall 8 in the coupled state, so that the blocking element 15 is arranged in an inoperative position outside the pivoting range of the lever arms 10. As is apparent from FIG. 2, the blocking element 15 is arranged in front of the lever arms 10 in the inoperative position, so that the said lever arms can engage the recesses 13 to assume the coupled state.

To pivot the lever arms 10 from the coupled state into their position associated with the uncoupled state, a cam plate 17 is mounted rotatably on the housing rear wall 8, and the cams 18 of the said cam plate 17 (see FIG. 7) cooperate with transport projections 19 arranged at the end of each blocking lever 10 facing away from the pivoted mount. The cam plate 17 is rotated now by the motor 6 via a gear mechanism, not shown.

Figure 4:
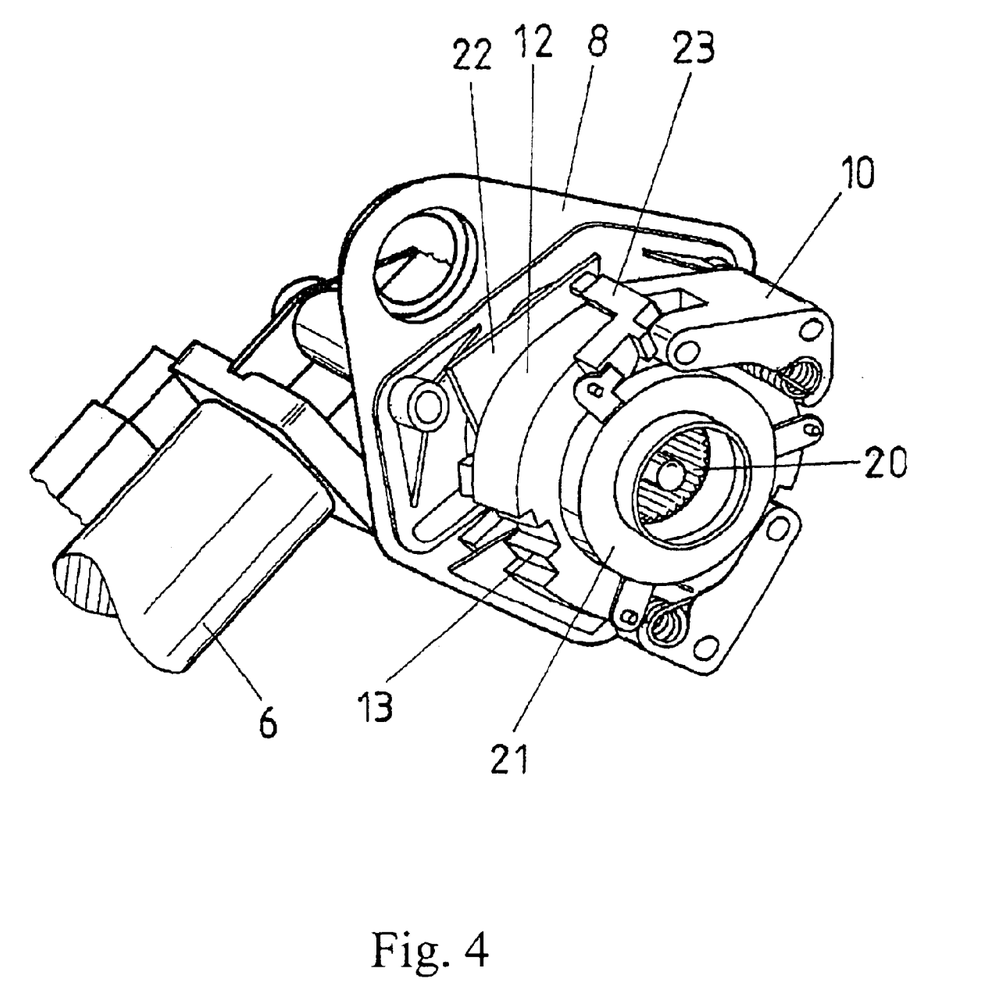
FIG. 4 is a perspective view of the embodiment according to FIG. 1 in another partially assembled state.

FIG. 4 shows the embodiment according to FIG. 3 in the coupled state without the first shaft 1, without the screws 5 and without the blocking element 15 as well as without one of the lever arms 10 with the spring leg 11 belonging to it. A hole for receiving the first shaft 1 is formed in the center of the locking disk 12, and an inner toothed ring 20 is formed on the circumferential surface of the said hole, the said inner toothed ring 20 cooperating with an outer toothed ring, not shown, at the end of the first shaft 1 facing the second shaft 2 in a positive locking manner, as a result of which the connection between the first shaft 1 and the locking disk 12, which connection rotates in unison, is formed. A ring-shaped electromagnet 21, which is arranged in the housing concentrically to the first shaft 1 and stationarily, is formed on the front side of the locking disk 12, which said front side faces away from the housing rear wall 8. The first shaft 1 passes through the electromagnet 21 and is rotatable in same. An electric current flows through the electromagnet 21 in the uncoupled state, so that the blocking element 15, made of a ferromagnetic material, is attracted by the electromagnet 21 because of the magnetic force until the blocking element 15 comes into contact with the electromagnet 21. The blocking element 15 is now arranged in the blocked position between the lever arms 10 and the first shaft 1, so that the lever arms 10 are held by the blocking cams 16 at a spaced location from the locking disk 12 even if the cam disk 17 is now rotated into a position associated with the coupled state.

The blocking element 15 is connected to a resetting spring, not shown, which resets the blocking element 15 in the non-energized state of the electromagnet 21 along the first shaft 1 into the inoperative position at a spaced location from the electromagnet 21. Since the blocking element 15 is no longer arranged between the lever arms 10 and the first shaft 1 in the inoperative position, the lever arms 10 are pivoted against the locking disk 12 with their locking bolts 14 because of the force of the springs 11, and the locking bolts 14 either come into contact with the jacket surface of the locking disk 12 or they directly engage the recesses 13 of the locking disk 12.

The magnetic field of the current-carrying electromagnet 21 is strong enough to move the blocking element 15 into the blocked position against the force of the resetting spring and to hold it in this position. To switch the electromagnet 21 on and off, the electromagnet is electrically connected to a printed circuit board 22 via a contact bridge 23, the printed circuit board 22 being in turn connected to an evaluating and control unit, not shown.

Figure 5:
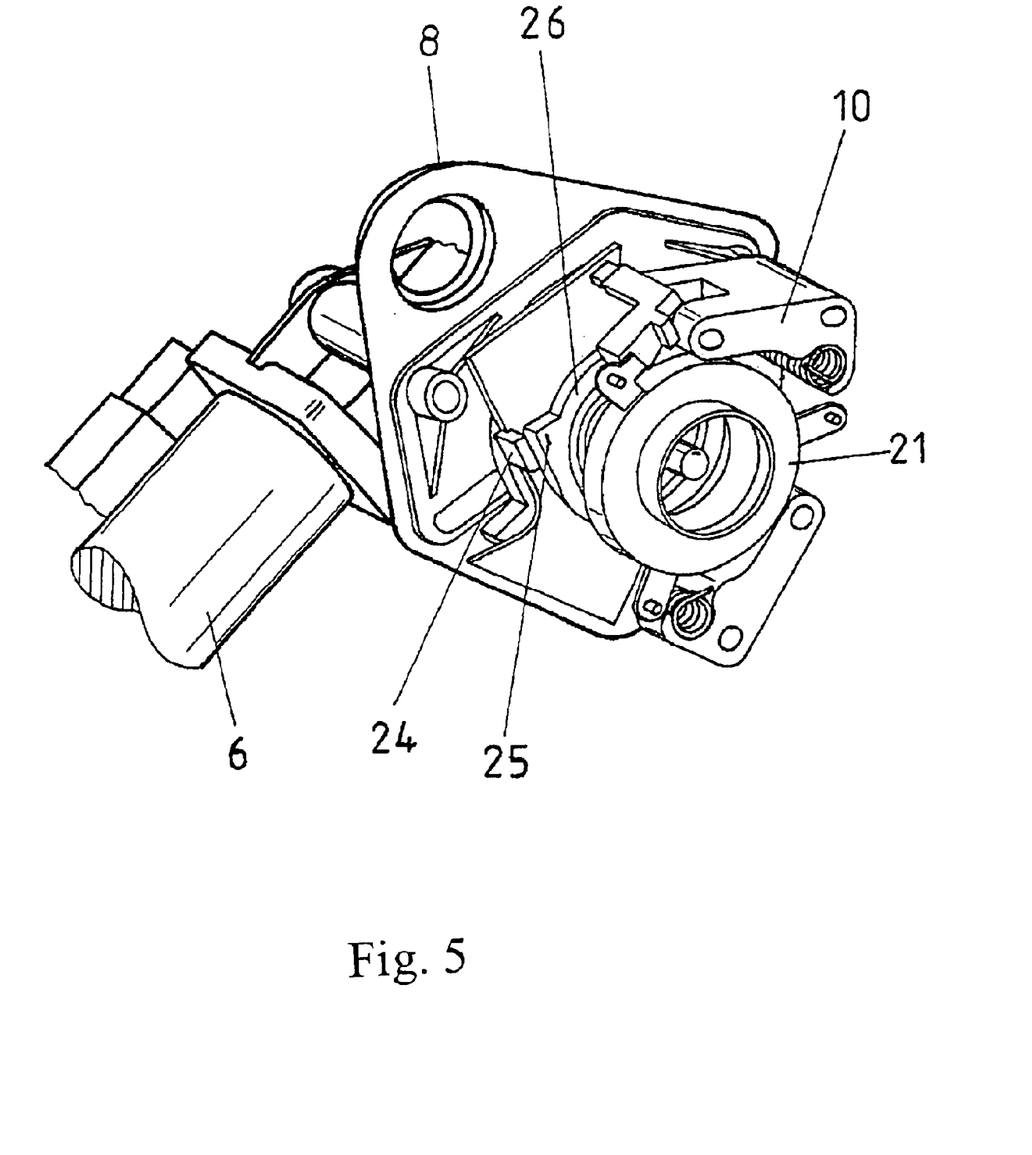
FIG. 5 is a perspective view of the embodiment according to FIG. 1 in another partially assembled state.

FIG. 5 shows the embodiment according to FIG. 4 in the coupled state without the locking disk 12. A permanent magnet 24 is fastened to each of the lever arms 10, the permanent magnet 24 visible in FIG. 5 being shown without the associated lever arm 10 for clarity's sake. Furthermore, a Hall effect sensor 25 mounted on the printed circuit board 10 in the area of the corresponding lever arm 10 is associated with each of the three permanent magnets 24. Each lever arm 10 is farther away from the locking disk 12 in the uncoupled state than in the coupled state, so that each of the permanent magnets 24 is, however, farther away from the associated Hall effect sensor 25 in the uncoupled state than in the coupled state. This can be detected by the Hall effect sensors 25 and an electric signal characterizing the coupled state or the uncoupled state can be sent to the evaluating and control unit. Since the lever arms 10 have a greater distance from the locking disk 12 in the precoupled state than in the coupled state, distinction can additionally be made between the precoupled state and the coupled state on the basis of the signal sent by the Hall effect sensors 25.

To stabilize the position of the Hall effect sensors 25, these are arranged in a supporting ring 26 made of plastic. This is desirable because of the high mechanical stress on the stabilizer during the operation of the motor vehicle.

The permanent magnet 24 shown in FIG. 5 is arranged in its position associated with the coupled state and has only a short distance from the Hall effect sensor 25 associated with it.

Figure 6:
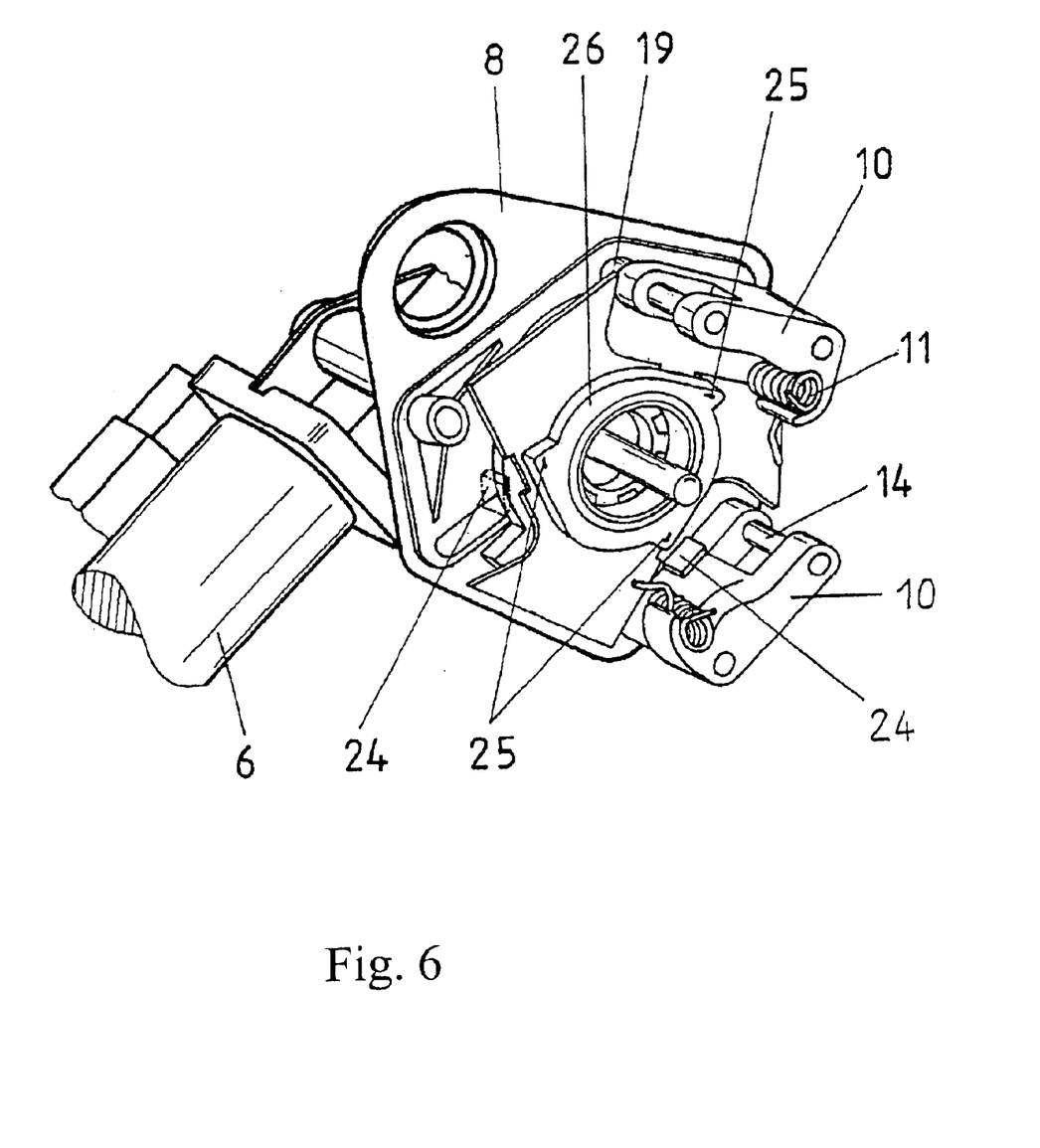
FIG. 6 is a perspective view of the embodiment according to FIG. 1 in another partially assembled state.

FIG. 6 shows the embodiment according to FIG. 5 in the uncoupled state without the electromagnet 21 and without the contact bridge 23. Because of the uncoupled state, the permanent magnets 24 are located farther away from the Hall effect sensors 25 than in the coupled state (see FIG. 5), so that the Hall effect sensors 25 send a changed electric signal compared with the coupled state.

Figure 7:
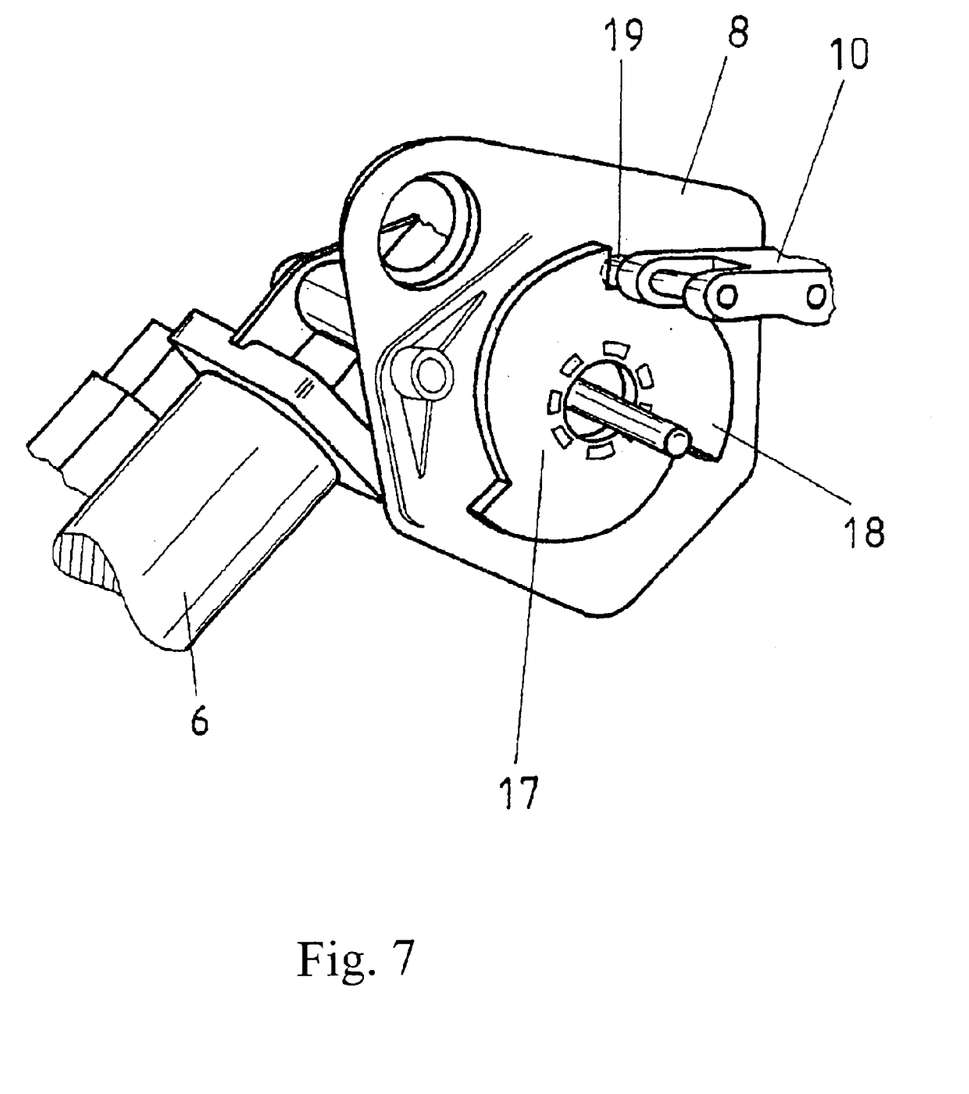
FIG. 7 is a perspective view of the embodiment according to FIG. 1 in another partially assembled state.

FIG. 7 shows the embodiment according to FIG. 6, omitting additional device features, where one of the lever arms 10 is indicated only symbolically in the coupled state. The cam plate 17 is mounted rotatably on the housing rear wall 8, and the lever arm 10 with its transport projection 19 is in contact with one of the cams 18. The cams 18 are designed in the form of a bent sawtooth, so that the lever arm 10 shown slides with its transport projection 19 along the surface of the cam 18 during a counterclockwise rotation of the cam plate 17 and it continuously increases its distance from the axis of rotation of the cam plate 17. However, the distance between the end of the lever arm 10 facing away from the pivoted mount and the locking disk 12 is also increased as a result at the same time, so that the lever arm 10 is disengaged from the recess 13 associated with it.

While a specific embodiment of the invention has been shown and described in detail to illustrate the application of the principles of the invention, it will be understood that the invention may be embodied otherwise without departing from such principles.

What is claimed is:

1. A stabilizer for a motor vehicle, the stabilizer, composing:

a torsion bar divided into two shafts;

a mechanical coupling connecting said two shafts, said mechanical coupling having a locking disk connected to a first of said two shafts and rotating in unison with said first of said two shafts, said locking disk having a circumference forming a locking area, a housing connected to a second of said two shafts, said housing rotating with in unison with said second of said two shafts, a locking means mounted movably on said housing said locking means having a form with a portion complementary to said locking area, said locking means engaging said locking area in a coupled state of the mechanical coupling, a spring connected to said housing and connected to said locking means and said spring pretensioning said locking means in a direction of said locking disk, and a release means provided for switching over between a coupled state and an uncoupled state of the coupling, said release means being conned to said housing and keeping said locking means disengaged from said locking area in the uncoupled state against the Force applied by said spring.

2. A stabilizer in accordance with claim 1, wherein said locking area is formed by a recess and said locking means includes a lever arm mounted pivotably by an end of said lever arm at said housing and said lever arm having another end engaging said recess in the coupled state.

3. A stabilizer in accordance with claim 1 wherein said release means has a cam plate arranged concentrically to said locking disk and is mounted rotatably on said housing in relation to said housing.

4. A stabilizer in accordance with claim 3, wherein said release means has a electric motor fastened to said housing and is coupled with said cam plate for rotating said cam plate.

5. A stabilizer in accordance with claim 1, further comprising an evaluating unit and a sensor for sending an electric signal characterizing the coupled and uncoupled states to said evaluating unit, said sensor being arranged at the mechanical coupling for detecting the coupled and/or uncoupled state.

6. A stabilizer in accordance with claim 5, wherein said release means has an electromagnet arranged stationarily in relation to said housing and a blocking element mounted movably in relation to said housing, said blocking element being at least partially magnetizable and being brought by said magnetized electromagnet against the force applied by a resetting spring in the uncoupled stale into a blocked position, in which said locking means is held mechanically disengaged from said locking area by said blocking element.

7. A stabilizer in accordance with claim 5, wherein a slope angle measuring device for detecting the angle by which the two shafts are twisted in relation to one another in the uncoupled state is provided at the coupling said slope angle measuring device sending an electric signal characterizing the detected angle to the evaluating unit.

8. A stabilizer in accordance with claim 7, wherein a level angle measuring device for determining the angle by which one of the to shafts is twisted relatively in relation to the motor vehicle body is provided at the coupling said level angle measuring device sending an electric signal characterizing the angle determined to evaluating unit.

9. A stabilizer in accordance with claim 7, further comprising a controllable level relating mean controllable by the evaluating unit to bring abut the coupled state.

10. A stabilizer in accordance with claim 1, further comprising two additional locking means wherein two additional locking areas are provided on the circumference of said locking disk, said two additional locking means being associated with said two additional locking areas and being complementary to same, said two additional locking means being mounted movably on said housing, wherein an angle of 120° is formed between said locking areas.

11. A motor vehicle stabilizer, comprising:
    a first torsion bar shaft;
    a second torsion bar shaft;
    a mechanical coupling connecting said first torsion bar shaft to said second torsion bar shaft, said mechanical coupling including a locking disk connected to said first torsion bar shaft and rotating in unison with said first torsion bar shaft, said locking disk having a circumference forming a locking area, a housing connected to said second torsion bar shaft, said housing rotating in unison with said second torsion bar shaft, a locking mechanism mounted movably on said housing, said locking mechanism having a form with a portion complementary to said locking area, said locking mechanism engaging said locking area in a coupled state of the mechanism coupling, a spring connected to said housing and connected to said locking mechanism and said spring pretensioning said locking mechanism in a direction of said locking disk, and a release mechanism provided for switching over between a coupled state and an uncoupled state of the coupling, said release mechanism being connected to said housing and keeping said locking mechanism disengaged from said locking area in the uncoupled state against the force applied by said spring.

12. A motor vehicle stabilizer in accordance with claim 11, wherein said locking area is formed by a recess and said locking mechanism includes a lever arm mounted pivotably by an end of said lever arm at said housing and said lever arm having another end engaging said recess in the coupled stake.

13. A motor vehicle stabilizer in accordance with claim 11, wherein said release mechanism has a cam plate arranged concentrically to said locking disk and is mounted rotatably on said housing in relation to said housing.

14. A motor vehicle stabilizer in accordance with claim 13, wherein said release mechanism has a electric motor fastened to said housing and is coupled with said cam plate for rotating said cam plate.

15. A motor vehicle stabilizer in accordance with claim 11, further comprising an evaluating unit and a sensor for sending an electric signal characterizing the coupled and uncoupled states to said evaluating unit, said sensor being arranged at the mechanical coupling for detecting the coupled and/or uncoupled state.

16. A motor vehicle stabilizer in accordance with claim 15, wherein said release mechanism has an electromagnet arranged stationarily in relation to said housing and a blocking element mounted movably in relation to said housing said blocking element being at least partially magnetizable and being brought by said magnetized electromagnet against the force applied by a resetting spring in the uncoupled state into a blocked position, in which said locking mechanism is held mechanically disengaged from said locking area by said blocking element.

17. A motor vehicle stabilizer in accordance with claim 16, wherein a slope angle measuring device for detecting the angle by which the two shafts are twisted in relation to one another in the uncoupled state is provided at the coupling, said slope angle measuring device sending an electric signal characterizing the detected angle to said evaluating unit.

18. A motor vehicle stabilizer in accordance with claim 17, wherein a level angle measuring device for determining the angle by which one of the two shafts is twisted relatively in relation to the motor vehicle body is provided at the coupling, said level angle measuring device sending an electric signal characterizing the angle determined to the evaluating unit.

19. A motor vehicle stabilizer in accordance with claim 18, further comprising a controllable level regulating means controllable by the evaluating unit to bring about the coupled state.

20. A motor vehicle stabilizer in accordance with claim 11, further comprising two additional locking mechanisms wherein two additional locking areas awe provided on the circumference of said locking disk, said two additional locking mechanism being associated with said two additional locking areas and being complementary to same, said two additional locking mechanism being mounted movably on said housing, wherein an angle of 120° is formed between said locking areas.

* * * * *